United States Patent
Ekholm (10) Patent No.: US 9,721,278 B2
(45) Date of Patent: Aug. 1, 2017

(54) METHOD, SYSTEM AND COMPUTER PROGRAM PRODUCT FOR DYNAMICALLY PRICING PERISHABLE GOODS

(71) Applicant: ECONOMEMETICS AB, Helsinki (FI)

(72) Inventor: Anders Goran Ekholm, Helsinki (FI)

(73) Assignee: ECONOMEMETICS AB, Helsinki (FI)

(*) Notice: Subject to any disclaimer, the term of this patent is extended or adjusted under 35 U.S.C. 154(b) by 567 days.

(21) Appl. No.: 14/316,394

(22) Filed: Jun. 26, 2014

(65) Prior Publication Data
US 2014/0310067 A1 Oct. 16, 2014

Related U.S. Application Data (63) Continuation-in-part of application No. 13/246,062, filed on Sep. 27, 2011, now abandoned.
(Continued)

(51) Int. Cl.
| | | |
|---|---|---|
| G06Q 30/06 | (2012.01) | |
| G06Q 30/08 | (2012.01) | |
| G06Q 30/02 | (2012.01) | |

(52) U.S. Cl.
CPC ..... *G06Q 30/0283* (2013.01); *G06Q 30/0206* (2013.01); *G06Q 30/0601* (2013.01); *G06Q 30/08* (2013.01)

(58) Field of Classification Search
CPC .... G06Q 10/02; G06Q 30/08; G06Q 30/0206; G06Q 30/0283
(Continued)

(56) References Cited

U.S. PATENT DOCUMENTS

| | | |
|---|---|---|
| 7,010,494 B2 | 3/2006 | Etzioni et al. |
| 7,720,708 B1 | 5/2010 | Elkins et al. |

(Continued)

OTHER PUBLICATIONS

Chen, J-M, et al., "Pricing and Lot-Sizing for a Deteriorating Item in a Periodic Review Inventory System with Shortages," Journal of the Operational Research Society, vol. 55, pp. 892-901 (2004).
(Continued)

*Primary Examiner* — Nicholas D Rosen
(74) *Attorney, Agent, or Firm* — Birch, Stewart, Kolasch & Birch, LLP (57) ABSTRACT

Techniques for dynamically pricing perishable goods. The objective is to sell all items before any remaining items become worthless. The method comprises: monitoring a time parameter T corresponding to period $T_0$ to $T_n$; if $T<T_n$, periodically updating current price $P_{current}$ for an item; in response client's interest, offering a temporarily fixed price $P_{freeze}=P_{current}$ for a freeze period $\Delta T_{freeze}$; updating $P_{current}$ in response to offering the fixed price $P_{freeze}$; accepting a purchase order for the item at $P_{freeze}$ if purchase order received within the freeze period $\Delta T_{freeze}$; rejecting the purchase order after the freeze period $\Delta T_{freeze}$; updating $P_{current}$ in response to receiving an accepted and/or rejected order; and repeating at least some of the above acts until T equals maximum time Tn.

9 Claims, 5 Drawing Sheets

Related U.S. Application Data (60) Provisional application No. 61/386,589, filed on Sep. 27, 2010.

(58) Field of Classification Search
USPC .................................. 705/5, 26.3, 7.35, 26.1
See application file for complete search history.

(56) References Cited

U.S. PATENT DOCUMENTS

| | | |
|---|---|---|
| 7,885,855 B2 | 2/2011 | Kerth et al. |
| 7,941,350 B2 | 5/2011 | Ginsburg et al. |
| 2005/0004819 A1 | 1/2005 | Etzioni et al. |
| 2005/0289042 A1 | 12/2005 | Friesen |
| 2006/0277109 A1 | 12/2006 | Kerth et al. |
| 2008/0281662 A1 | 11/2008 | Ginsburg et al. |
| 2009/0216571 A1 | 8/2009 | Sunshine et al. |
| 2010/0049616 A1 | 2/2010 | Hipsher |
| 2010/0257000 A1 | 10/2010 | Harris |

OTHER PUBLICATIONS

Finch, H., et al., "Option-Based Approach for Pricing Perishable Services Assets, An," Journal of Services Marketing, vol. 12, No. 6, pp. 473-483 (1998).

Zhao, W., et al., "Optimal Dynamic Pricing for Perishable Assets with Nonhomogeneous Demand," Management Science, vol. 46, No. 3, pp. 375-388, Mar. 2000.

METHOD, SYSTEM AND COMPUTER PROGRAM PRODUCT FOR DYNAMICALLY PRICING PERISHABLE GOODS

PARENT CASE INFORMATION

The present invention is a continuation-in-part application based on U.S. Non-Provisional application Ser. No. 13/246062 (published as 2012/0084173), filed on Sep. 27, 2011, which claims the benefit of U.S. Provisional Application No. 61/386,589 filed on Sep. 27, 2010. Both parent applications are hereby incorporated by reference.

TECHNICAL FIELD

The present invention relates to a method, computer program product and system for dynamically pricing goods, such as items of perishable goods.

BACKGROUND

Methods and systems of different complexity for pricing products exist. These methods and systems take into account the price sensitivity of customers. The price sensitivity is then used to establish sales strategies which seek to maximize revenue.

Since the price sensitivity of customers depends of numerous factors, of which many are difficult to predict or even totally unknown, a product is often priced incorrectly. If the price is set too low, this normally has the effect that the product is sold out too quickly. For the seller this means that he or she will lose revenue since a higher average price would most likely have been possible to achieve. If the price of the product is set too high, some or all of the products will remain unsold, which might translate into lost revenues for the seller. The risk of mispricing is especially high for perishable goods (e.g. transportation, events, and accommodation), since their value perishes at a certain point in time.

Incorrect pricing is often a result of having predetermined prices, as these fail to encompass actual demand. The effects of incorrect pricing have been experienced by almost every one of us in our daily lives. Sold-out or half-full airplanes, movie theatres, music concerts, as well as grocery stores shelves filled with expired provisions are all examples of prices being set either too low or too high. Even if some steps towards more demand-driven pricing have been taken by for instance granting last-minute discounts on tickets and the like, such methods are normally based on predetermining prices based on historical data and/or the practical experience of the seller. Consequently, there is a need to develop better techniques for pricing perishable goods.

SUMMARY OF THE DISCLOSURE

Towards satisfaction of this need, the present invention provides a method, a computer program product and system for dynamically pricing perishable goods.

According to an aspect, this is provided by a method, which comprises performing a pricing process for perishable goods on a programmed data processing apparatus, wherein the programmed data processing apparatus comprises a memory system for storing program code instructions and data, a processing system configured to execute at least some of the program code instructions and to process the data stored in the memory system, and wherein the processing system is operatively coupled to a database system, wherein the database system stores information on a plurality of items of goods, wherein the memory system comprises program code instructions for causing the processing system to carry out the pricing process, wherein the pricing process comprises the following acts for each of a plurality of items of goods:

a) monitoring a time parameter T corresponding to the time period from $T_0$ to $T_n$ when an item of goods is good for sale, and if the time parameter $T<T_n$;
b) periodically updating a current price $P_{current}$ for the item of goods;
c) in response to receiving an indication of interest to buy the item of goods, offering a temporarily fixed price $P_{freeze}$ equal to current price $P_{current}$ for a freeze time period $\Delta T_{freeze}$;
d) automatically updating the current price $P_{current}$ in response to offering a temporarily fixed price $P_{freeze}$;
e) accepting a purchase order for the item of goods at the temporarily fixed price $P_{freeze}$ if the purchase order is received within the freeze time period $\Delta T_{freeze}$;
f) rejecting the purchase order if it is received after the freeze time period $\Delta T_{freeze}$;
g) automatically updating the current price $P_{current}$ of the item of goods in response to receiving an accepted and/or rejected order; and automatically repeating the acts b through g until the time parameter T equals the maximum time $T_n$.

The so-called "limited time period" is typically a strictly limited time period.

According to another aspect of the present invention, there is provided a computer program product comprising computer-readable medium comprising code for causing a computer system to perform the above-identified acts.

According to yet another aspect of the present invention, there is provided a data processing system. The data processing system is specifically adapted to carry out the method according to the invention, by virtue of a database system and a memory system, wherein the database system stores information related to registered items of goods, in particular perishable items of goods, are stored, wherein the database system further stores the registered items of goods for sale offered on a virtual marketplace, as well as updated information relative to the contents.

The invention and/or its embodiments offer specific advantages in the field of pricing perishable items of goods or products, since the price of the items of goods is dynamically updated in accordance to the real demand with the objective of selling all of the items of goods for sale before the point in time any remaining items of goods become worthless. More efficient pricing will result in benefits for all parties yielding the seller greater revenues and the customers a product supply better suited for the demand. This means better allocation of resources in the economy; i.e. more use, less waste.

Perishable items of goods, or in other words "perishable goods", by their nature become worthless at a certain point in time regardless whether they are used or not. Therefore it is important to rapidly price the items correctly as the time available for finding out the true demand function is sharply limited; this is especially true for the case of perishable goods. A dynamically adjusted price allocates the purchases more evenly over time and therefore make better use of the economic resources (for example, IT infrastructure and customer services). Examples of perishable goods include but are not limited to: transportation (e.g. airline, bus, ferry, and train tickets), events (e.g. game, concert, and movie tickets), accommodation (e.g. hotel rooms), rental (e.g. car hire), and provisions (food, beverage, etc.)

Instead of taking into account the underlying factors which influences the price sensitivity of the customers, by means of the method, computer program product and system according to the present invention, the customers' behaviors are registered, measured and analyzed by the information extractable from the interaction between price and demand. The customer's price sensitivity is then used by the invention without knowing the underlying factors that influence and drive the customers' price sensitivity. The method and system according to the present invention discovers the real need from the extracted information and dynamically updates the price thereafter.

Moreover, a minimum of presumptions has to be made since the information regarding the demand is derived from both when there is no sale and when there is a sale. The price is updated every time there is buying interest, an accepted order, a rejected order, and at the end of each time interval.

Some implementations of the invention emphasize the fact that this price is in fact a dynamic price, so that customers are aware that the price could change and also what sort of rules are valid for this sort of commerce, for example how long the current price is valid, so the customers feel safe with this. It is preferred that this communication, or dialog, with the customers is plain and straightforward in order to achieve full acceptance for the concept of dynamic pricing of perishable goods in the public on a large scale.

BRIEF DESCRIPTION OF THE DRAWINGS

In the following section, specific embodiments of the invention will be described in greater detail in connection with illustrative but non-restrictive examples. A reference is made to the following drawings.

DETAILED DESCRIPTION OF SOME SPECIFIC EMBODIMENTS

Figure 1:
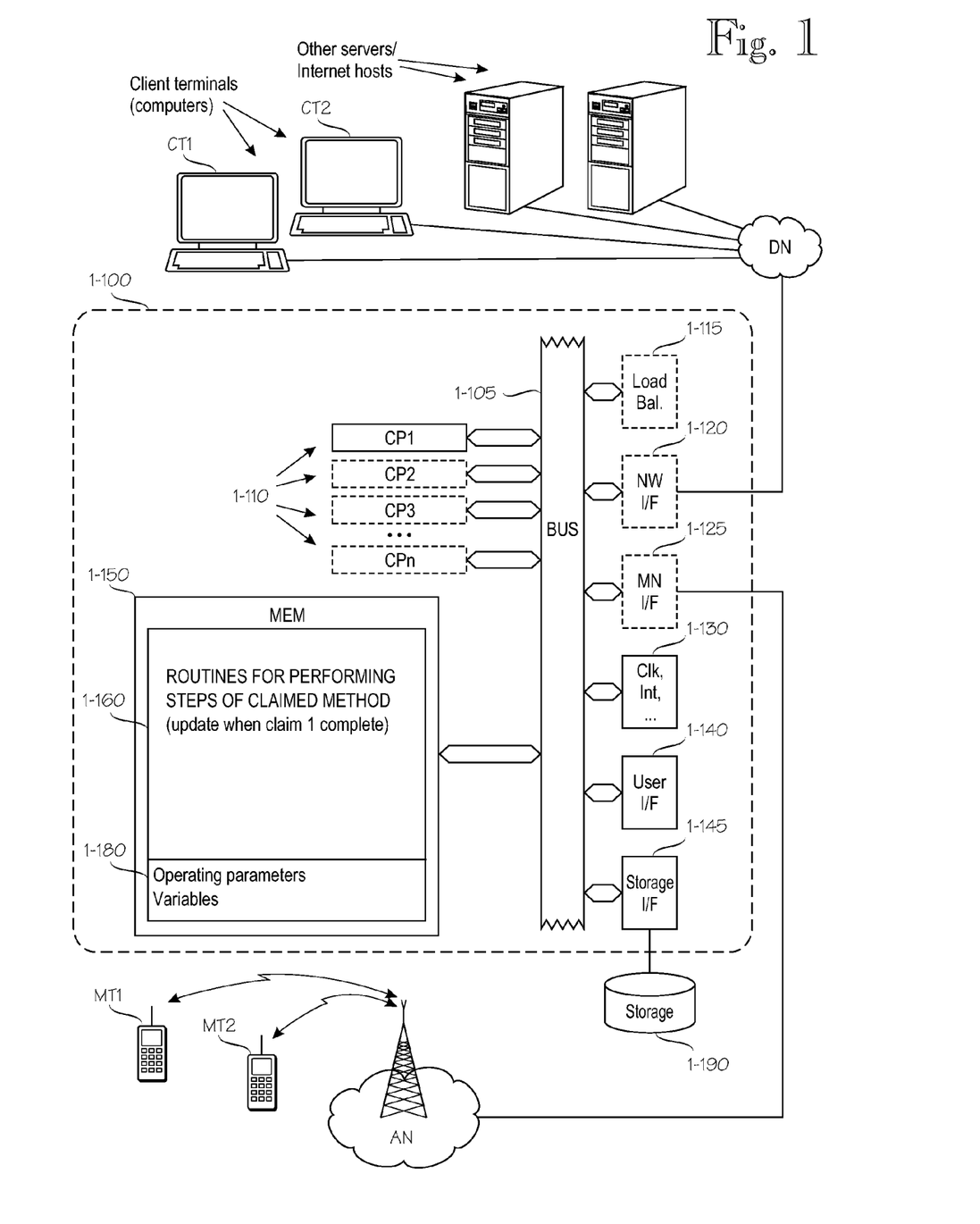
FIG. 1 shows an illustrative but non-restrictive implementation for a data processing system specifically adapted to carry out a method according to the invention.

FIG. 1 shows an illustrative but non-restrictive implementation for a data processing system specifically adapted to carry out a method according to the invention. The data processing system shown in FIG. 1 comprises a server system 1-100 configured to cooperate with other servers (internet hosts) and client terminals, which may include computers of various type and configuration, tablet computers, smartphones, or the like. By way of example, reference signs CT1, CT2 denote two client terminals, which are shown as desktop or laptop computers, which access the server computer 1-100 through the internet. Reference signs MT1, MT2 denote two mobile terminals, such as smartphones, tablet computers or the like, which access the server computer 1-100 through a wireless access network AN.

The server computer 1-100 comprises one or more central processing units CP1 . . . CPn, generally denoted by reference numeral 1-110. Embodiments comprising multiple processing units 1-110 are preferably provided with a load balancing unit 1-115 that balances processing load among the multiple processing units 1-110. The multiple processing units 1-110 may be implemented as separate processor components or as physical processor cores or virtual processors within a single component case. The server computer 1-100 further comprises a network interface 1-120 for communicating with various data networks, which are generally denoted by reference sign DN. The data networks DN may include local-area networks, such as an Ethernet network, and/or wide-area networks, such as the internet. The server computer 1-100 serves one or more client terminals, and communicates with other servers or hosts, via the data networks DN, a typical example of which is the internet.

The server computer 1-100 of the present embodiment also comprises a user interface 1-140. Depending on implementation, the user interface 1-140 may comprise local input-output circuitry for a local user interface, such as a keyboard, touch screen, mouse and/or display (not shown). Alternatively or additionally, management of the server computer 1-100 may be implemented remotely, by utilizing the network interface 1-120 and a terminal similar to the work stations WS. The nature of the user interface depends on which kind of computer is used to implement the server computer 1-100. If the server computer 1-100 is a dedicated computer, it may not need a local user interface, and the server computer 1-100 may be managed remotely, such as from a web browser over the internet, for example. Such remote management may be accomplished via the same network interface 1-120 that the server computer utilizes for traffic between itself and the client terminals.

The server computer 1-100 of the present embodiment may optionally have a mobile network interface 1-125, in order to communicate with mobile terminals via one or more wireless access networks AN.

The server computer 1-100 also comprises memory 1-150 for storing program instructions, operating parameters and variables. Reference numeral 1-160 de-notes a program suite for the server computer 1-100.

The server computer 1-100 also comprises circuitry for various clocks, interrupts and the like, and these are generally depicted by reference numeral 1-130. The server computer 1-100 further comprises a disk interface to the disk system 1-190. The various elements 1-110 through 1-150 intercommunicate via a bus 1-105, which carries address signals, data signals and control signals, as is well known to those skilled in the art.

The one or more client terminals may employ a data processing architecture, which is basically similar to that of the server computer, although the client terminals typically require less storage space than server computers do.

One of the adaptations of the data processing system 1-100, in order to carry out the techniques of the invention, include an operative coupling from the server computer 1-100 to a database or set of databases, generally denoted by reference number 1-190.

An adaptation of the server computer 1-100, in order to carry out the techniques of the invention, includes providing one or more of the computers, such as the server computer itself, or the client terminals, with program code instructions for instructing the set of processors 1-110 to execute the functions of the method according to the invention and/or its embodiments. Specifically, the functions of the inventive method include the acts defined in claim 1.

The embodiment shown in FIG. 1 is by no means exclusive, and other implementations are possible. For instance, the database system and the memory system storing program code instructions for causing the processing system to carry out the inventive process can be installed in one or more of the client terminals, in which case a separate server is not necessary for the self-sufficient client terminals.

Figure 2:
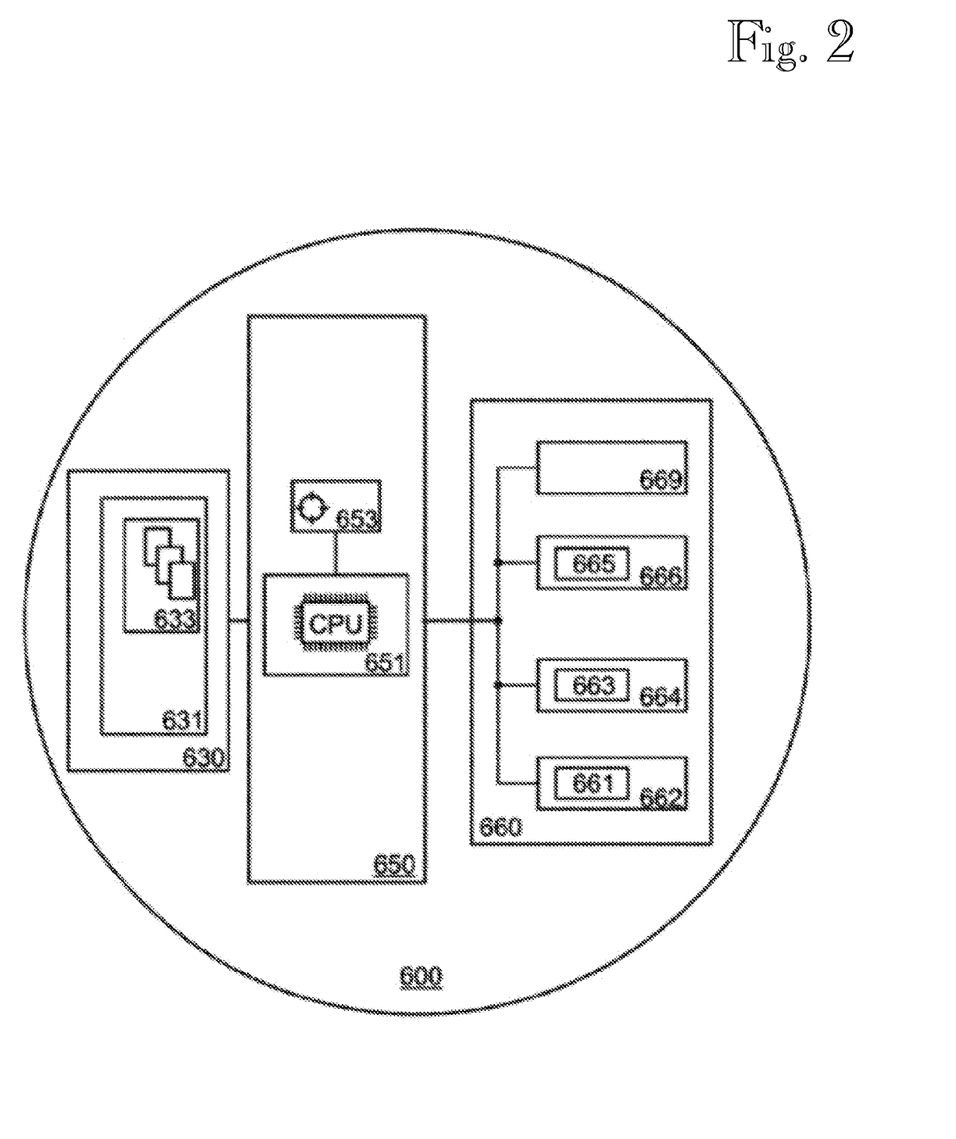
FIG. 2 illustrates a governing node (server) of the dynamic pricing system shown in FIG. 1.

Referring now to FIG. 2, it is illustrated and described how dynamical pricing of perishable items of goods is performed according to an embodiment of the invention, related to a method, computer program product and system. FIG. 2 shows a governing node, denoted by reference number 600, which can be implemented similarly to the server system 1-100 shown in FIG. 1.

The governing node 600 in FIG. 2 comprises at least one database 630, a computing device 650 and data storage 660 and constitutes together with the client terminals and/or mobile terminals CT1, CT2, MT1, MT2 shown in FIG. 1 a network, which in this aspect is regarded as a virtual marketplace. Most of the commerce in the virtual marketplace does not take place physically as in a normal marketplace, like a bazaar or a store where the products are offered to the customers by sales people in the store, behind stalls or from the shelves by the owner of the store. Instead the customers, or agents acting on their behalf, get access to the items of goods, or products, for offer typically by logging into a web page, homepage, or portal, in the "virtual world" in order to get access to the information contents of the governing node 600, such as the products for offer and their price. This can typically be performed by entering and/or selecting the web address, domain name or IP address. A web page is normally accessible from any of the client terminals and/or mobile terminals CT1, CT2, MT1, MT2 (e.g. a client or a customer), via a web server where the customer, or client, uses a particular type of software, typically a so called web browser to access a web page. The client terminals and/or mobile terminals CT1, CT2, MT1, MT2, such as communication devices used by customers, can interact with the contents in the governing node 600, for example via the web browser. The browser "reads" the contents of the database 630, or any processed contents, e.g. processed data, and provides a presentation of the contents to at least one of the client terminals and/or mobile terminals CT1, CT2, MT1, MT2. Of course, many other ways of interaction between the nodes and the customers are possible; like the use of be pop-ups, e-mail or SMS-reminders, or the like, moreover today constant access, such as continuous login, is possible all around the world.

The database 630 comprises a readable and writeable register 631, or data memory, wherein information related to registered items of goods 633, in particular perishable items of goods, are stored. The database 630 stores the contents (i.e. the registered items of goods 633) for sale offered on the virtual marketplace and updated information relative to the contents, such as updated prices etc.

The information regarding the items of goods 633 is typically the price, sort or type, time- and date stamps, a related product number, the total, or remaining number of items of goods 633, a time parameter (T or t), or any other type of relevant information needed to perform calculations and/or processing as well as storing the information.

The database 630 records each purchase of an item 633 and the relevant information associated with it, and the dynamic pricing in connection with the computing device 650, which perform relevant calculations such as to update the price of each item 633 for sale. This updated and the related information is typically also stored in the database 630. The price can be updated for any time period, for example every millisecond, second, minute, hour, day, week, month, and year.

The computing device 650, also referred to as a computer, comprises at least one processing unit 651, for example a CPU (Central Processing Unit), arranged to receive, transmit, route, calculate or process information (e.g. data) within the governing node 600. The processing unit 651 is typically directly connected to all other units or components within the governing node 600, such as the database 630, the data storage 660 and indirectly to all other client terminals and/or mobile terminals CT1, CT2, MT1, MT2 in the network 100 through their interfaces, respectively. The computing device 650 can also comprise a variety of other devices responsive to software instructions, a hardwired state device or a combination of these. The computing device 650 also comprises a time and datum device 653 for measuring, recording and synchronizing time and date in the system 100 of FIG. 1, and is typically used to time and date stamp events, such e.g. purchases, in- and/or out-going orders etc., in the system 100, but could also be used to count down the time before the items of goods 633, becomes useless or expires.

The data storage 660 comprised in the governing node 600 stores computer-executable instructions e.g. data programs, machine codes or computer software. The data storage 660 comprises a data memory 669, for example, internal RAM, hard disc, optical disk, USB-stick, or the like, as is well known in the art.

The data storage 660 also resides a first set of computer-executable instructions 661 comprised in a first data storage segment 662, where the first set of computer-executable instructions 661 comprise the instructions needed to perform all steps of the inventive method for dynamically pricing the items of goods 633, e.g. the products such as perishable goods, and will be described more thoroughly in this disclosure of the invention. The purpose of the first set of computer-executable instructions 661 is that the registered items of goods 633, such as the products offered for sale on the virtual market could be provided, presented, processed and dynamically priced according to the method of the invention. These computer-executable instructions 661 are also configured to govern components within the governing node 600 in order to perform the inventive method by any associated hardwired design or computer program product, such as a particular software, but many other ways are of course conceivable.

The data storage 660 also resides a second set of computer-executable instructions 663 comprised in a second data storage segment 664, where the second set of computer-executable instructions 663 are arranged to control the communication in the system 100 (e.g. the network) between the governing node 600 and the client terminals and/or mobile terminals CT1, CT2, MT1, MT2. These instructions could also enable secure communication and generate digital certificates, which preferably are encrypted, compressed and signed. In administrating individual products (i.e. registered items of goods 633), especially if different customers, users or clients are involved, there is certainly a need for a set of rules which governs and protects information such as credit card and bank account communications and traceability as well as authorized response, hence the digital certificate serves as a key, or as a secure communication line, for the user. Such certificates could be generated by the computing device 650 and distributed to the client terminals and/or mobile terminals CT1, CT2, MT1, MT2. It should be appreciated that any, some, or all of the client terminals and/or mobile terminals CT1, CT2, MT1, MT2, as well as the governing node 600 could comprise computer-executable instructions, either hardwired and/or comprised as software which allow them to communicate with each other in the system and over the network.

Furthermore, the data storage 660 comprises a third data storage segment 666 comprising a third set of computer-executable instructions 665 arranged to control the basic operations of the processor 651. The third data storage segment 666 is typically a non-volatile memory and the third set of computer-executable instruction 665 could for example be an operative system, the machine code, or firmware of the computing device 650 and/or its components.

In this case, the computer-executable instructions 661, 663 and 665 are comprised in the data storage 660, but could of course also be arranged in an Internet-application. It is also conceivable that the data storage 660 is located at an external location, e.g. distributed in or at the client terminals and/or mobile terminals CT1, CT2, MT1, MT2.

Further alternatives and combinations of different interfaces, communications protocols, computer-executable instructions, data storages, communication links etc. required will not be described in more detail since this is conventional technology and therefore obvious for a person skilled in the art of electronics and computer science to design.

Figure 3:
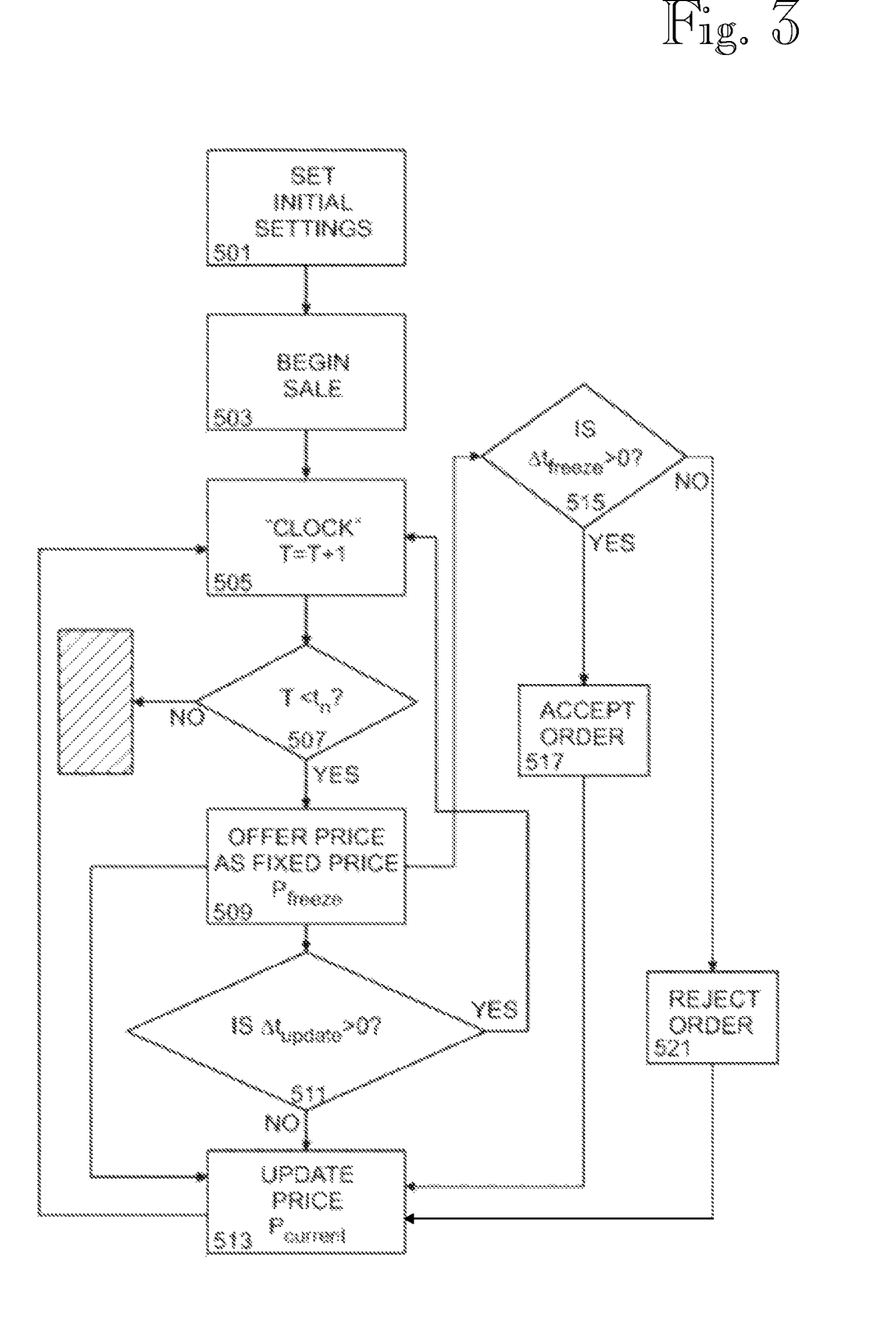
FIG. 3 illustrates a flow-chart of a method according to an embodiment of the present invention.

Referring now to FIG. 3, an embodiment of a method is illustrated, which can be provided by means of the inventive system and computer program product described above.

To start, typically initial settings, including the total number of items for sale, initial price $P_0$, begin sale time $T_0$, end sale time $T_n$, stale quote offer period $\Delta T_{freeze}$, update frequency time period $\Delta T_{update}$ and minimum price $P_{minimum}$ is set 501. Then sale of goods having a current price $P_{current}=P_0$ at begin sale time $T=T_0$ begins 503.

Initial settings are set 501, a total number of items of goods 633, in particular perishable items of goods, are registered in the database 630 and offered 503 for sale. The number of perishable items of goods 633 offered for sale can be limited. The unique characteristics of perishable items of goods is that perishable items of goods are products, or goods, which value is to deteriorate or decay to the point of being unserviceable, useless or worthless, and by their very nature cannot be conserved indefinitely. Examples of perishable items of goods 633 could be tickets to an event, tickets for travelling, accommodations such as hotel rooms, provisions with a best-before-date, and the like.

The items of goods 633 are associated with a begin sale parameter $T_0$, time parameter T and end of sale parameter $T_n$. The time parameter T is defined as the current time 505. Sale commences when $T=T_0$, and the maximum point in time the items of goods 633 becomes worthless or useless is $T=T_n$. Some typical examples of when items of goods become worthless are concert tickets after the concert has finished, train tickets after departure, the expiry of best-before-date of provisions like milk, meat, fish in a grocery store or the like. This time could also be any point in time the sale ends due to any particular restriction in time or any other reason. The entire time the items of goods 633, i.e. the products, will "live" in this respect is then the time it will become worthless $T_n$ subtracted with the time the sale commenced $T_0$. Hence $T_0 \leq T \leq T_n$ is controlled.

As an illustrative example, assume that the data processing system stores data concerning a number of (e.g. one hundred) tickets for a music concert that will occur in one week. The data processing system described herein will next offer these tickets for sale on the virtual market. Each ticket will hence "live" $(T_n-T_0)$ one week. Tickets are offered for sale at time $T=T_0$. It could be convenient to convert absolute time (minutes/hours/days, etc.) into relative time, and absolute volume (number of items of goods sold) into relative volume. Converting absolute time into relative time can be done by first subtracting the time when the sale commenced $T_0$ from the time parameter T. Then the ratio, where the elapsed sales time $T-T_0$ is placed in the numerator, and the total sales time $T_n-T_0$ in the denominator, i.e. $(T-T_0)/(T_n-T_0)$, varies between 0 to 1, or between 0% to 100%, which is a convenient way to illustrate how long the items of goods 633 have "lived" or existed, and how much time they have left before they will "perish". When this ratio equals 1, or 100%, "time's up" for the perishable items of goods 633. After that point in time, the perishable items of goods 633 are regarded as worthless or significantly less worth.

The initial price setting 501 is preferably performed by using some sort of price estimation method where information regarding the items of goods 633 is used as a basis for that estimation. If there have been similar sales situations in the past, these can be used in order to estimate an average historical price and hence the initial price.

If there is historical sales data (time and price for each item sold at hand) the average cumulative volume sold as a function of time can be estimated empirically. The shape ACV'(T) of the average cumulative volume function is determined by estimating the average cumulative volume sold as a function of time on historical sales data. ACV'(T) can be linear, exponential, logarithmic or any combination of these, as well as a plurality of other function types. The average cumulative volume function ACV(t) is then determined by calibrating ACV'(T) so that it results in 100% of the items being sold when 100% when time is up $(T=T_n)$.

According to an embodiment of the present invention, a time parameter T is controlled 505. Next, if the time parameter $T \leq T_n$ 507, then an update frequency time period $\Delta T_{update}$ is counted down 511 until the price is updated. When a potential buyer ask for a quote, a frozen (temporarily locked) price $P_{freeze}$ is offered 509 for a strictly limited time $\Delta T_{freeze}$. The current price $P_{current}$, which is offered to other buyer is then instantaneously updated, in order to reflect the potential buyers' interest.

If an order to buy the item of goods is received 515 before end of the limited time $\Delta T_{freeze}$, the order is accepted 517. The order is rejected 521 if the order is received after 515 the limited time period $\Delta T_{freeze}$ has elapsed. In the exemplary flowchart FIG. 3, the $\Delta T_{freeze}$ is initially set to a positive value, from which it is decremented until it reaches zero or a negative value, by which time the order will be rejected.

The current price $P_{current}$ of the item of goods is automatically updated 513 in accordance with a time of offering price as fixed price 509, elapsing of update frequency time period $\Delta T_{update}$ 511, and time of receiving order 517 to buy the goods, and the steps above are automatically repeated until the time parameter T equals the time for end sale parameter $T_n$ 507.

The price function which in one embodiment of the invention will calculate the dynamic price of the perishable items of goods 633 is given below.

$$P_{current}=\alpha*CV(T)/ACV(T)*(\beta*P_0+\Sigma[\gamma_{T-\pi}*P_{T-\pi}])$$

The coefficient α is set according to how aggressively the seller wants the price to change. The coefficient α can be a constant, for instance one. The coefficient α can also be defined as a function of time T and cumulative volume CV(T), etc. Coefficient β determines how much the initial price $P_0$ is weighted when calculating the current price $P_{current}$. Coefficients $\gamma_{T-\pi}$ determine how much the corresponding time T–π prices $P_{T-\pi}$ are weighted when calculating the current price $P_{current}$. Typically $1 \le \pi \le T$ and $\beta + \Sigma [\gamma_{T-\pi}] = 1$. By inserting the current time T into the average cumulative volume (ACV) sold as a function of time, the data processing system can output an estimate of how many items of goods 633 should have been sold in order for exactly all the items of goods to be sold at $t_n$.

Figure 4:
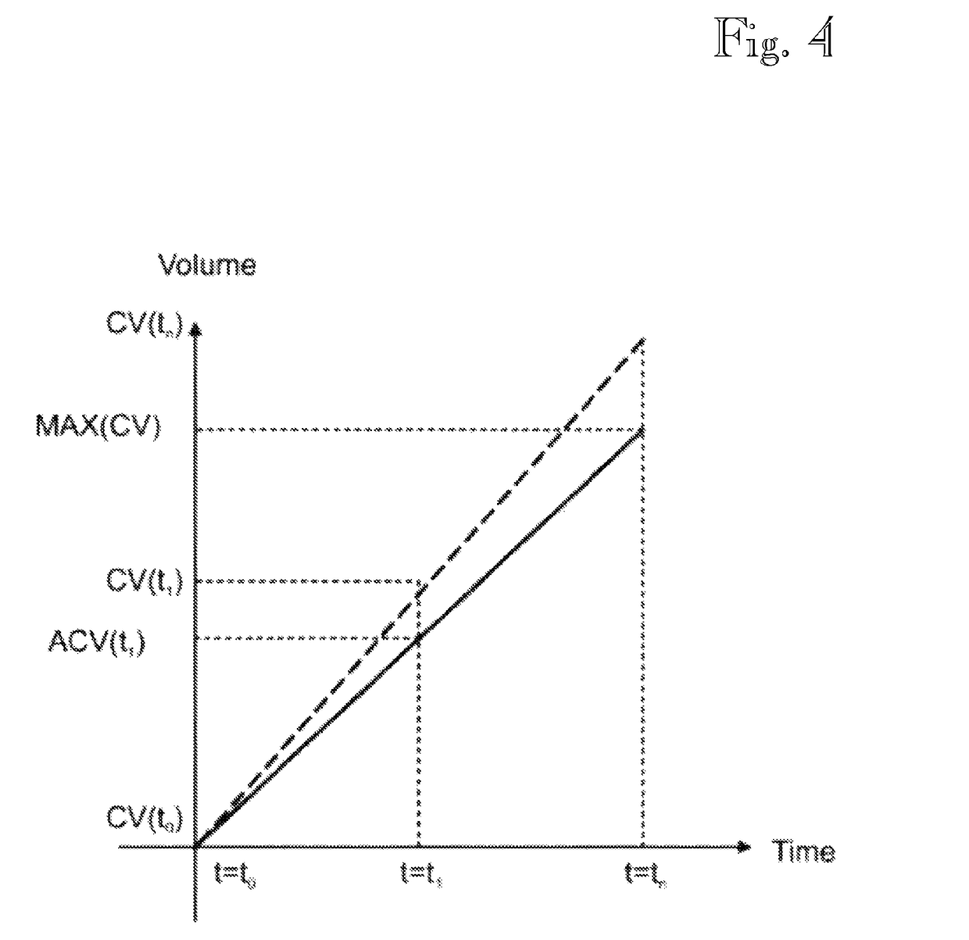
FIG. 4 is a graph illustrating how a dynamic price is set.

To illustrate how a dynamic price is set, consider equation 1 above, as can be seen in FIG. 4. Here CV(T) is the cumulative volume, that is how many items of goods 633 that have been sold at time T. If CV(T)>ACV(T) then the current price $P_{current}$ would typically be higher than the initial price $P_0$. If CV(T)<ACV(T) then the current price $P_{current}$ would typically be lower than the initial price $P_0$.

The initial price $P_0$ is typically set to the price that is estimated to exactly sell out the maximum cumulative volume of the perishable goods MAX(CV) by end time $T_n$. To illustrate this further, assume the sale begins at time initial time $T_0$ with initial price $P_0$, which is the seller's best estimate for a price that will sell exactly all of the perishable goods MAX(CV). The initial price $P_0$ would hence typically correspond to an ex-ante estimated fixed price. Also, a minimum price $P_{minimum}$ is set, which for instance could equal to the marginal delivery cost for one unit of the perishable goods in question.

At a time $T=T_1$ cumulative volume $CV(T_1)$, i.e. the dotted line in FIG. 4, has been quoted or sold. By inserting $T_1$ into the average cumulative volume function $ACV(T_1)$, i.e. the solid line in FIG. 4, we get an estimate of how many items of goods should have been sold at time $T=T_1$ in order for exactly the maximum cumulative volume MAX(CV) to be sold by time $T=T_n$. The price $P_1$ at time $T=T_1$ is set to:

$$P_1 = \alpha * CV(T_1)/ACV(T_1) * (\beta * P_0 + \gamma_0 * P_0)$$

where $P_0$ is the initial price at initial time $T=T_0$. Typically, $P_1 > P_0$ in the example illustrated in FIG. 4.

Figure 5:
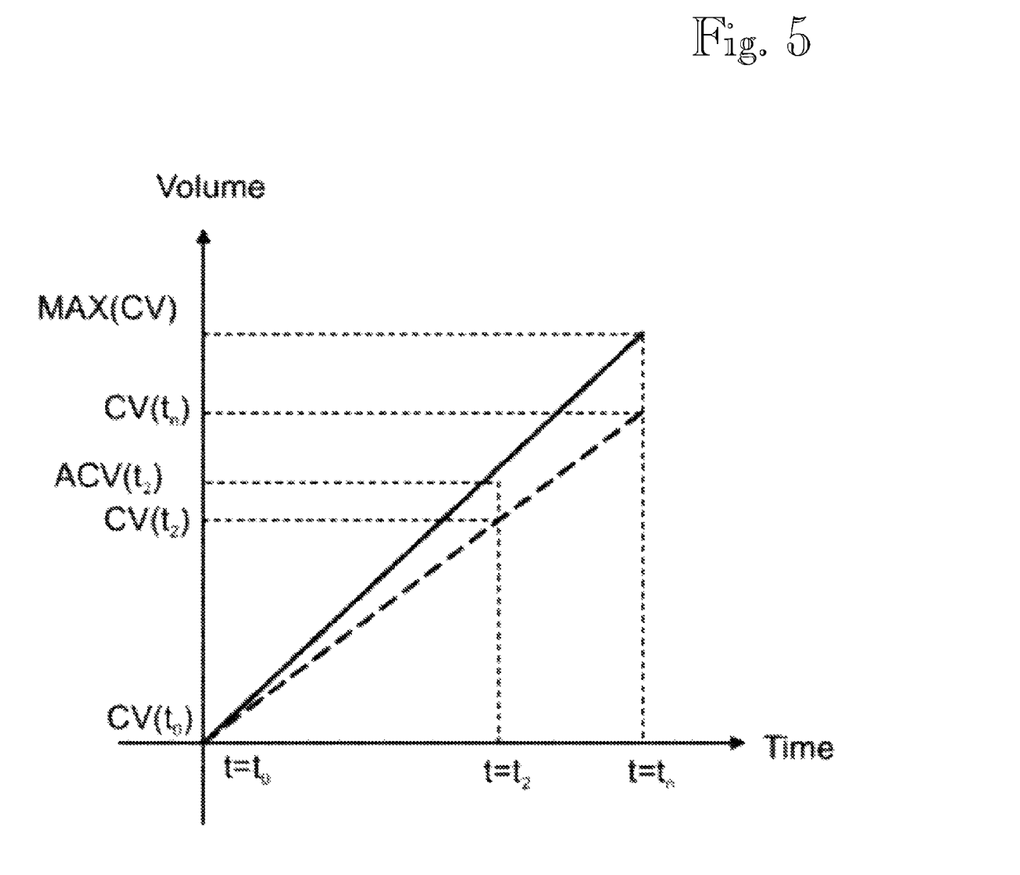
FIG. 5 is a graph illustrating how a dynamic price is set.

A reference is now made to FIG. 5. At a second time $T=T_2$, a second cumulative volume $CV(T_2)$ has been quoted or sold, i.e. the dotted line in FIG. 5. The price $P_2$ at time $T=T_2$ is now set to:

$$P_2 = \alpha * CV(T_2)/ACV(T_2) * (\beta * P_0 + \gamma_0 * P_0 + \gamma_1 * P_1)$$

Typically, $P_2 < P_0$ in the example illustrated in FIG. 5.

Selling ends when the items of goods, i.e. product perishes at time $T=T_n$. The price database contains a complete history of sales price, volume and time, which can be used in order to estimate an average volume function for another product at another occasions.

Thus, as could be concluded from the above, the dynamic method for dynamically pricing perishable items of goods will update the dynamic price for every moment in time so that exactly all of the items of goods are expected to be sold at the highest possible average price before the point in time any remaining items of goods become worthless. However the price of any individual item should always be higher than or equal to the marginal costs which the seller incurs as a consequence of selling the item.

Although important, the estimation of the cumulative volume function ACV(T) in comparison with the method for dynamically pricing is of secondary importance since the method for dynamically pricing will very rapidly update any errors in the average cumulative volume function ACV(T) due to the continuous information flow in the system once the sale has commenced, and will correlate this information with any data registered in the database 630 for the particular sales situation at hand.

Once the initial price of the items of goods 633 is set, communicated (e.g. presented at the homepage, or broadcasted to the nodes in the system) on the virtual market, the algorithms for the dynamical pricing method determined and the commence starts, this price is continuously updated as a dynamic price. If a customer (e.g. a node in the system) initiates a request to order, "quote", the dynamic price is presented as a temporary frozen price during a limited time period $\Delta T_{freeze}$.

Typically, according to an embodiment of the present invention, a fixed price $P_{freeze}$ is offered for a maximum number of items $V_{quote}$ during a limited interval of time $\Delta T_{freeze}$ for each customer session (or demand). The current price $P_{current}$ is also updated while the dynamic price is presented as a temporary frozen price $P_{freeze}$ during a limited time period $\Delta T_{freeze}$, as if the customer would have purchased the quoted items. If the price is confirmed by the customer within the time period $\Delta T_{freeze}$, the order is accepted, otherwise, a new price, equal to the current price $P_{current}$, offered is presented to the customer having a new $\Delta T_{freeze}$. This provides more efficient pricing since it hinders customers from locking in an artificially low average price by asking for a large number of frozen prices without the current price $P_{current}$ reacting to this.

One preferred aspect of the invention is to dynamically update the price of the items of goods 633 in accordance to the real demand in the virtual market with the objective of selling all of the items of goods 633 for sale before the point in time any remaining items of goods become worthless. Thus there is a given inventory of items of goods 633 to be sold out before $T=T_n$. This is typically also combined with a mechanism to restrict the possibility to order all, or a large number, of the items of goods 633 offered for sale during at least one occasion, since it would otherwise be possible to order all of the items of goods 633 when the price is favorable and then in turn offer them for sale on a secondary market. The possibility to order items of goods 633 is thus only valid for a certain volume at one time; and even if this might be seen as a small detail, it is in fact a crucial feature of the invention since this will introduce regulated liquidity on the virtual market which reduces the risk of secondary markets to arise.

Therefore the total number of items of goods 633 offered for sale is divided into parts and offered to the customers in the virtual market in such parts. Each such part will for convenience hereafter be called a package which is a particular subset of all the items of goods 633 registered in the database 630. Hence, the maximum numbers of items of goods 633 an interested customer can order at a single occasion are the number of items of goods 633 in a single package during the limited time $\Delta T_{freeze}$.

If at least one of the items of goods 633 in one such package is ordered 517 during that particular limited time $\Delta T_{freeze}$ 515, the dynamic price is updated 513 immediately in the system for other customers who have not initiated a request to order.

The dynamic price is also updated 513 when a fixed price is offered 509, when the time interval update $\Delta T_{update}$ has elapsed 511, and when an order is rejected 521. Hence, the dynamic price is updated 513 when there is a frozen quote 509, an accepted order 517, a rejected order 521, and when time elapses 511.

It is also preferred to emphasize that the invention makes use of both information given every time there is a sale as well as when there is no sale. In both cases the dynamic price converges towards the real demand for the particular sale situation at hand. In the first case, i.e. when there is sale, the dynamic price will normally increase in order to lower the demand, and in the second case, i.e. when there is no sale, the dynamic price will normally decrease in order to stimulate the demand.

The activity on the virtual market is also of high interest. If, for example a lot of customers visit the homepage (e.g. found out by analyzing the number of IP addresses logged in) but do not order any item 633, this is typically also important information, since a high activity at the homepage but low or no request of orders indicates that the time interval update $\Delta T_{update}$ typically should be decreased in order to stimulate the demand. If there is low activity, e.g. during the night, the time interval update $\Delta T_{update}$ may be prolonged between the updates since the decrease of the dynamic price could otherwise be too rapid. Another way to tackle this problem could be that the dynamical price is not allowed to decrease below a certain threshold value, which for example could be determined by the margin costs of the items of goods 633. From the IP addresses the system can estimate how many customers that are logged-in, and could automatically change the length of the time interval update $\Delta T_{update}$ or other essential parameters in accordance with that information.

To illustrate the feature of the invention that restricts the possibility to order a large or high volume of items of goods 633 during one or a few successive number of occasions, assume the one hundred tickets mentioned as an example above are split into packages of for example five tickets each. The number of packages offered for sale on the virtual market simultaneously will hence be twenty. Once a customer, who typically is logged in on the homepage has initiated a request to order at least one ticket (i.e. an item 633), for example by pushing a "QUOTE-button", or the similar, the dynamic price is temporarily frozen for that customer during the time slot $\Delta T_{freeze}$. By this is meant that the price is fixed at a particular level during that time slot $\Delta T_{freeze}$ for that specific customer. This temporary frozen price is a snap-shot of the dynamic price at that instant and it is held during the time slot $\Delta T_{freeze}$, but the dynamic price is continuously computed by the computing device as a response of the demand, both fixed price quotes 509 and accepted orders 517, and rejected orders 521 on the virtual market. Hence, the dynamic price is immediately updated in accordance with a temporarily frozen dynamic price and volume being offered 509 to a customer. This difference could for example be presented to the customers in two different windows on the homepage, where typically also information regarding how much time is left for the temporarily frozen price $\Delta T_{freeze}$ 515 is displayed for the specifically offered frozen dynamic price, for example in a window with the text "now there is only x seconds left to order for this frozen dynamic price". Temporarily freezing the dynamic price makes it possible for the customer, once he or she has initiated a request to order, to enter specific details associated with the order like, for example, the number of tickets (i.e. items of goods 633) wanted, a credit card number, home address, email address, telephone number, bank details, etc., without risk that the dynamic price will change while entering such details to the seller. If a smaller amount of tickets is ordered by a customer, for example only two tickets in the offered package of five, the dynamic price is updated 513 in the system in accordance with that an order of two tickets is accepted 517 and an order of three tickets is rejected 521. If other customers have initiated an order 509, they could see this updated dynamic price 513, but their temporarily fixed price is still valid during their individually associated time slot $\Delta T_{freeze}$ 515.

Even if the twenty packages are offered on the virtual market simultaneously it is only possible for one single customer to order a maximum of one package (comprising five tickets) for the, at that instant, offered price during the time slot $\Delta T_{freeze}$ 515. The customer's ID is typically confirmed in some way by the system where the customer's IP-address associated with his device is one obvious alternative. Typically, the first order influences the price of the second order even if they arrive very close in time to each other.

As already indicated this feature of the invention will make it harder for wholesalers to make profits on a secondary market by buying all or a large number of the items of goods 633. For example, all or a large number of the tickets to a music concert with a famous artist, or a popular sports event, and hold on them until just days or even hours before the event is about to occur in order to maximize the profit for themselves.

The following example illustrates one aspect of dealing with delayed buying orders of the invention. Assume the commence starts at time 12:00:00 for the initial price 100 USD. One package comprises five items of goods, the update time period $\Delta T_{update}$ 511 is five seconds and the dynamic price is updated 513 after the update time period $\Delta T_{update}$ has elapsed 511, and at every temporarily fixed quote 509, accepted order 517, and rejected order 521. The limited frozen price time period $\Delta T_{freeze}$ 515 is set to two seconds, which means that orders are accepted up to two seconds after the dynamic price has been quoted to a customer as a fixed price.

12:00:00 The sale begins.
12:00:01 Two items of goods are quoted to a customer at a temporarily fixed price 509 of 100 USD each. The dynamic price is updated 513 to 105 USD.
12:00:03 An order of two items of goods 633 for 100 USD each is received within $\Delta T_{freeze}$ 515 and accepted 517. The dynamic price is updated 513 to 110 USD.
12:00:08 Five seconds $\Delta T_{update}$ 511 elapse without quotes or sales. The dynamic price is updated 513 to 105 USD
12:00:10 Four items of goods are quoted 509 to a customer at 105 USD each. The dynamic price is updated 513 to 115 USD
12:00:12 No order is received within $\Delta T_{freeze}$ 515 and the quoted four items are hence rejected 521. The dynamic price is updated 513 to 105 USD.
12:00:17 Five seconds $\Delta T_{update}$ 511 elapse without quotes or sales. The dynamic price is updated 513 to 100 USD.

Those skilled in the art will realize that the inventive principle may be modified in various ways without departing from the spirit and scope of the present invention. For instance, the virtual market could also be any physical market offering perishable goods as well, such as food articles in a grocery store, a shop, warehouse etc. Any of the nodes in the virtual market could also in some way be closer associated with a physical market. A node could for example be at least one physical stationary cash register disposed at any store (products, food), hotel check-in desk, a movie theatre, zoo, museum, gallery, amusement park, or alike.

The invention claimed is:
1. A method comprising:
performing a pricing process for perishable goods on a programmed data processing apparatus,
wherein the programmed data processing apparatus comprises a memory system for storing program code instructions and data, a processing system configured to execute at least some of the program code instructions and to process the data stored in the memory system, and wherein the processing system is operatively coupled to a database system, wherein the database system stores information on a plurality of items of goods, wherein the memory system comprises program code instructions for causing the processing system to carry out the pricing process, wherein the pricing process comprises the following acts for each of a plurality of items of goods:

a) monitoring a time parameter T corresponding to the time period from $T_0$ to $T_n$ when an item of goods is good for sale, and if the time parameter $T<T_n$;

b) periodically updating a current price $P_{current}$ for the item of goods at every predetermined time interval to dynamically reflect potential buyers' interests, based on an estimation of how many items of goods should have been sold in order for exactly all of the items of goods to be sold at the highest possible average price before $T_n$, and a real demand for an ongoing sale situation after commerce starts;

c) producing a virtual marketplace displaying in a general buyer interface information of the item of goods including the periodically updated current price $P_{current}$ viewable by buyers through buyer terminals connected to the virtual marketplace via a network;

d) receiving an indication of interest to buy the item of goods from a particular buyer through one of the buyer terminals interacting with the virtual marketplace;

e) in response to receiving the indication of interest to buy the item of goods, generating a buyer specific buyer interface associated with the time of receiving the indication of interest, displaying in the buyer specific buyer interface a temporarily fixed price $P_{freeze}$ equal to current price $P_{current}$ for a freeze time period $\Delta T_{freeze}$, viewable through the buyer terminal by said particular buyer that indicated the interest to buy the items of goods;

f) automatically updating the current price $P_{current}$ in response to offering a temporarily fixed price $P_{freeze}$, taking into consideration the indication of interest, and displaying in the general buyer interface the updated current price $P_{current}$ viewable by buyers through buyer terminals connected to the virtual marketplace;

g) keeping periodically updating the current price $P_{current}$ for the item of goods displayed in the general buyer interface while keeping the temporarily fixed price $P_{freeze}$ displayed in the buyer specific buyer interface unchanged during the freeze time period $\Delta T_{freeze}$;

h) accepting a purchase order for the item of goods at the temporarily fixed price $P_{freeze}$ if the purchase order is received within the freeze time period $\Delta T_{freeze}$ from the buyer terminal interacting with the displayed item of goods in the virtual marketplace;

i) rejecting the purchase order if the purchase order is received after the freeze time period $\Delta T_{freeze}$;

j) automatically updating the current price $P_{current}$ of the item of goods in response to receiving an accepted and/or rejected order and displaying in the general buyer interface the updated current price $P_{current}$ viewable by buyers through buyer terminals connected to the virtual marketplace; and automatically repeating the acts b) through j) until the time parameter T equals the maximum time $T_n$.

2. The method according to claim 1, further comprising the step of: setting initial settings, including initial price $P_0$, update frequency time period $\Delta T_{update}$, beginning of sale time $T_0$, end of sale time $T_n$.

3. The method according to claim 2, wherein the initial price $P_0$ is set to the highest price that will sell the maximum cumulative volume of the perishable goods MAX(CV) at time $T=T_n$.

4. The method according to claim 2, wherein a minimum price $P_{minimum}$ is set.

5. The method according to claim 1, further comprising the steps of: offering a temporarily fixed price $P_{freeze}$ equal to current price $P_{current}$ for a limited time period $\Delta T_{freeze}$ and updating the current price $P_{current}$ accordingly, and accepting an order if freeze time period $\Delta T_{freeze}>0$ and updating the current price $P_{current}$ accordingly.

6. The method according to claim 5, further comprising the step of: inserting time $T=T_1$ into an average cumulative volume function ACV(T) to estimate how many items of goods should have been sold in order for exactly the maximum cumulative volume MAX(CV) to be sold at time $T=T_n$, based on cumulative volume $CV(T_1)$ that has been sold at time $T_1$.

7. The method according to claim 6, wherein in case of no new sale, after a predetermined time interval, inserting time $T=T_2$ into the average cumulative volume function $ACV(T_2)$ to estimate how many items of goods should have been sold in order for exactly the maximum cumulative volume MAX(CV) to be sold at time $T=T_n$, based on cumulative volume $CV(T_2)$ that has been sold at time $T_2$.

8. A tangible non-transitory computer-readable medium comprising program code instructions for a data processing apparatus, wherein execution of the program code instructions causes the data processing apparatus to perform the acts of:

performing a pricing process for perishable goods on a programmed data processing apparatus, wherein the programmed data processing apparatus comprises a memory system for storing program code instructions and data, a processing system configured to execute at least some of the program code instructions and to process the data stored in the memory system, and wherein the processing system is operatively coupled to a database system, wherein the database system stores information on a plurality of items of goods, wherein the memory system comprises program code instructions for causing the processing system to carry out the pricing process, wherein the pricing process comprises the following acts for each of a plurality of items of goods:

a) monitoring a time parameter T corresponding to the time period from $T_0$ to $T_n$ when an item of goods is good for sale, and if the time parameter $T<T_n$;

b) periodically updating a current price $P_{current}$ for the item of goods at every predetermined time interval to dynamically reflect potential buyers' interests, based on an estimation of how many items of goods should have been sold in order for exactly all of the items of goods at the highest possible average price before $T_n$, a real demand for an ongoing sale situation after commerce starts;

c) producing a virtual marketplace displaying in a general buyer interface information of the item of goods including the periodically updated current price $P_{current}$ viewable by buyers through buyer terminals connected to the virtual marketplace via a network;

d) receiving an indication of interest to buy the item of goods from a particular buyer through one of the buyer terminals interacting with the virtual marketplace;

e) in response to receiving the indication of interest to buy the item of goods, generating a buyer specific buyer interface associated with the time of receiving the indication of interest, displaying in the buyer specific buyer interface a temporarily fixed price $P_{freeze}$ equal to current price $P_{current}$ for a freeze time period $\Delta T_{freeze}$, viewable through the buyer terminal by said particular buyer that indicated the interest to buy the items of goods;

f) automatically updating the current price $P_{current}$ in response to offering a temporarily fixed price $P_{freeze}$; taking into consideration the indication of interest, and displaying in the general buyer interface the updated current price $P_{current}$ viewable by buyers through buyer terminals connected to the virtual marketplace;

g) keeping periodically updating the current price $P_{current}$ for the item of goods displayed in the general buyer interface while keeping the temporarily fixed price $P_{freeze}$ displayed in the buyer specific buyer interface unchanged during the freeze time period $\Delta T_{freeze}$;

h) accepting a purchase order for the item of goods at the temporarily fixed price $P_{freeze}$ if the purchase order is received within the freeze time period $\Delta T_{freeze}$ from the buyer terminal interacting with the displayed item of goods in the virtual marketplace;

i) rejecting the purchase order if the purchase order is received after the freeze time period $\Delta T_{freeze}$;

j) automatically updating the current price $P_{current}$ of P the item of goods in response to receiving an accepted and/or rejected order and displaying in the general buyer interface the updated current price $P_{current}$ viewable by buyers through buyer terminals connected to the virtual marketplace; and automatically repeating the acts b) through j) until the time parameter T equals the maximum time $T_n$.

9. A system comprising:

a programmed data processing apparatus, wherein the programmed data processing apparatus comprises a memory system for storing program code instructions and data, a processing system configured to execute at least some of the program code instructions and to process the data stored in the memory system, and wherein the processing system is operatively coupled to a database system, wherein the database system stores information on a plurality of items of goods, wherein the memory system comprises program code instructions for causing the processing system to carry out the pricing process, wherein the pricing process comprises the following acts for each of a plurality of items of goods:

wherein the memory system comprises program code instructions for causing the processing system to carry out the pricing process, wherein the pricing process comprises the following acts for each of a plurality of items of goods:

a) monitoring a time parameter T corresponding to the time period from $T_0$ to $T_n$ when an item of goods is good for sale, and if the time parameter $T<T_n$;

b) periodically updating a current price $P_{current}$ for the item of goods at every predetermined time interval to dynamically reflect potential buyers' interests, based on an estimation of how many items of goods should have been sold in order for exactly all of the items of goods to be sold at the highest possible average price before $T_n$, and a real demand for an ongoing sale situation after commerce starts;

c) producing a virtual marketplace displaying in a general buyer interface information of the item of goods including the periodically updated current price $P_{current}$ viewable by buyers through buyer terminals connected to the virtual marketplace via a network;

d) receiving an indication of interest to buy the item of goods from a particular buyer through one of the buyer terminals interacting with the virtual marketplace;

e) in response to receiving the indication of interest to buy the item of goods, generating a buyer specific buyer interface associated with the time of receiving the indication of interest, displaying in the buyer specific buyer interface a temporarily fixed price $P_{freeze}$ equal to current price $P_{current}$ for a freeze time period $\Delta T_{freeze}$, viewable through the buyer terminal by said particular buyer that indicated the interest to buy the items of goods;

f) automatically updating the current price $P_{current}$ in response to offering a temporarily fixed price $P_{freeze}$; taking into consideration the indication of interest, and displaying in the general buyer interface the updated current price $P_{current}$ viewable by buyers through buyer terminals connected to the virtual marketplace;

g) keeping periodically updating the current price $P_{current}$ for the item of goods displayed in the general buyer interface while keeping the temporarily fixed price $P_{freeze}$ displayed in the buyer specific buyer interface unchanged during the freeze time period $\Delta T_{freeze}$;

h) accepting a purchase order for the item of goods at the temporarily fixed price $P_{freeze}$ if the purchase order is received within the freeze time period $\Delta T_{freeze}$ from the buyer terminal interacting with the displayed item of goods in the virtual marketplace;

i) rejecting the purchase order if the purchase order is received after the freeze time period $\Delta T_{freeze}$;

j) automatically updating the current price $P_{current}$ of the item of goods in response to receiving an accepted and/or rejected order and displaying in the general buyer interface the updated current price $P_{current}$ viewable by buyers through buyer terminals connected to the virtual marketplace; and automatically repeating the acts b) through j), until the time parameter T equals the maximum time $T_n$.

* * * * *